US006933706B2

(12) United States Patent
Shih

(10) Patent No.: US 6,933,706 B2
(45) Date of Patent: Aug. 23, 2005

(54) METHOD AND CIRCUIT FOR OPTIMIZING POWER EFFICIENCY IN A DC-DC CONVERTER

(75) Inventor: Hsien-Te Kevin Shih, Phoenx, AZ (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 25 days.

(21) Appl. No.: 10/662,062

(22) Filed: Sep. 15, 2003

(65) Prior Publication Data

US 2005/0057228 A1 Mar. 17, 2005

(51) Int. Cl.[7] .......................... G05F 1/652; G05F 1/613
(52) U.S. Cl. ..................... 323/222; 323/284; 323/274; 323/282
(58) Field of Search ................................. 323/222, 282, 323/283, 284, 273, 274

(56) References Cited

U.S. PATENT DOCUMENTS

| 5,682,303 | A | * | 10/1997 | Goad .......................... 363/71 |
| 5,982,160 | A | * | 11/1999 | Walters et al. .............. 323/282 |
| 6,058,037 | A | * | 5/2000 | Shibata et al. .............. 363/132 |
| 6,194,880 | B1 | * | 2/2001 | Fraidlin et al. .............. 323/222 |
| 6,246,220 | B1 | * | 6/2001 | Isham et al. ................. 323/224 |
| 6,396,250 | B1 | * | 5/2002 | Bridge ........................ 323/283 |
| 6,424,129 | B1 | * | 7/2002 | Lethellier ................... 323/272 |
| 6,441,597 | B1 | * | 8/2002 | Lethellier ................... 323/282 |
| 6,515,463 | B2 | | 2/2003 | Ling |
| 6,535,400 | B2 | | 3/2003 | Bridge |
| 6,798,180 | B2 | * | 9/2004 | Sase et al. .................. 323/282 |
| 6,812,677 | B2 | * | 11/2004 | Walters et al. .............. 323/277 |

\* cited by examiner

*Primary Examiner*—Bao Q. Vu
(74) *Attorney, Agent, or Firm*—Kevin B. Jackson; Robert F. Hightower

(57) ABSTRACT

In one embodiment, a turn-on delay control structure (30) includes a sense FET device (31) that is coupled to a switch node (13) in a synchronous DC-DC converter (10). The DC-DC converter includes a high-side switch (11) and a low-side switch (12). The sense FET device (31) senses current conduction in a body diode (18) of the low-side switch (12). A current sensing/comparator circuit (32) coupled to the sense FET (31) detects changes in current conduction. A delay circuit (33) and a clock/logic circuit (32) coupled to the current sensing/comparator circuit (32) predict and adjust delay time in switching between the high-side switch (11) and the low-side switch (12).

20 Claims, 11 Drawing Sheets

METHOD AND CIRCUIT FOR OPTIMIZING POWER EFFICIENCY IN A DC-DC CONVERTER

BACKGROUND OF THE INVENTION

This invention relates generally to power supply and power regulation applications, and more specifically to DC-DC power converters using synchronous power rectification.

DC-DC converters or switching regulators are widely established as an efficient means to convert one DC voltage to another desired DC voltage in electronic applications that require a stable power supply potential. In general, a DC-DC power converter is coupled to an input power source with a voltage level either lower than or higher than the voltage level required by an electronic device. Switching regulators indirectly regulate an average DC output voltage to a device or application by switching energy on and off in an inductor. By comparing the output voltage to a reference, the inductor current can be controlled to provide a desired output voltage.

Boost converters are implemented in applications requiring a higher operating voltage than is supplied by the input power source. Conversely, buck converters are utilized in applications requiring a lower operating voltage than is supplied by the input power source. A rectification circuit element such as a Schottky diode is commonly employed within the converter to enable uni-directional energy flow from the input power source to the electronic device or application.

Synchronous buck converters are a specific type of switching regulator that provide improved power efficiency over traditional converters by replacing the Schottky diode with a power switching device such as a power MOSFET device. A high-side switch (control switch) selectively couples the inductor to a positive input power supply, while a low-side switch (synchronous switch) selectively couples the inductor to ground. The high-side and low-side switches typically are controlled using a pulse width modulation (PWM) control circuit, although other control techniques such as ripple regulators and pulse frequency modulation (PFM) are known as well.

With continued advances in electronic devices and applications, power designers are driven to improve and optimize power consumption and efficiency. Although synchronous buck converters provide improved power efficiency compared traditional buck converters, power loss problems still exist. For example, significant power losses occur due to body diode conduction and reverse recovery in the low-side power MOSFET. Such losses result from a delay in switching between the high-side and low-side switches, which is necessary to prevent simultaneous conduction in both switches.

Accordingly, a needs exists for dc power regulation systems and methods for optimally controlling delay time when switching from a high-side switch to a low-side switch.

DETAILED DESCRIPTION OF THE DRAWINGS

In general, the present invention pertains to a system and method for controlling the time that switching devices are on and off in a synchronous DC-DC converter. More particularly, the present invention senses a low-side switch current difference to determine a pulse delay length required before turning on either the high-side or the low-side switch. This optimally minimizes power losses and maximizes the power efficiency of the converter.

Figure 1:
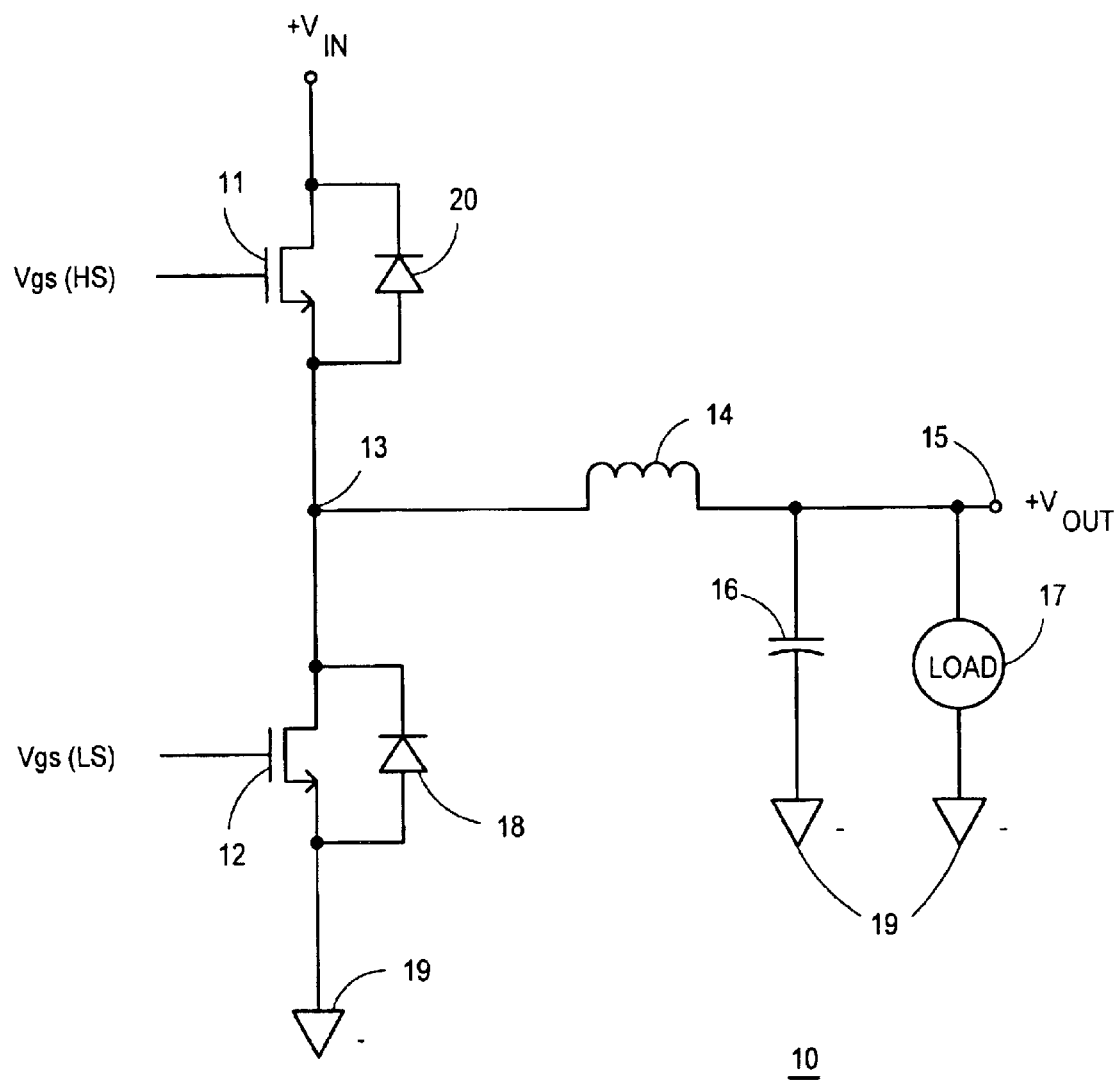
FIG. 1 illustrates a circuit diagram of a prior art DC-DC buck converter circuit.

FIG. 1 illustrates a conventional DC-DC buck converter circuit 10 with two power MOSFET transistors including a high side switch 11 and a low-side switch 12. High-side switch 11 includes a drain coupled to a supply voltage, first DC voltage, or $V_{in}$, and a source coupled to a switch node 13. Low-side switch 12 includes a drain coupled to switch node 13, and a source coupled to a ground node 19.

High-side switch 11 further includes a body diode 20, and low-side switch 12 includes a body diode 18. Each switch is driven by a respective gate signal voltage $V_{gs}(HS)$ or $V_{gs}(LS)$ that when applied in an alternative fashion provides a reduced average voltage at switch node 13 compared to $V_{in}$.

One terminal of an inductor 14 is coupled to switch node 13, and the other terminal is coupled to a positive voltage output or second DC voltage ($V_{out}$) terminal 15. A noise suppression capacitor 16 is additionally coupled to $V_{out}$ terminal 15 and to ground node 19. A resistance or load 17 is connected to $V_{out}$ terminal 15 and to ground node 19 to utilize the reduced average voltage provided by circuit 10.

Figure 2A:
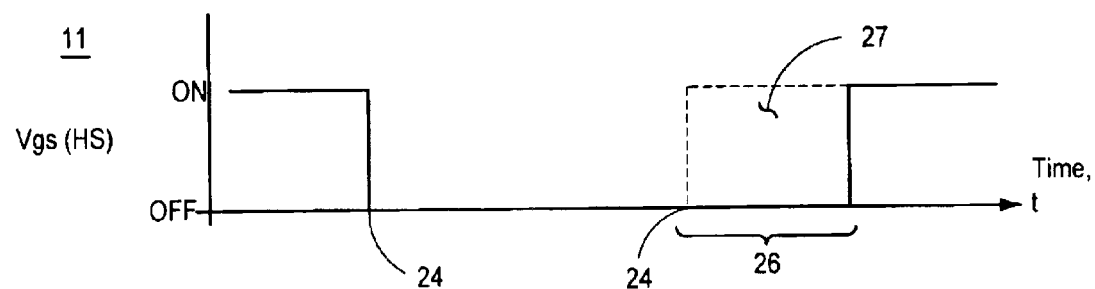
FIGS. 2a–c illustrate timing diagrams for the high-side and low-side switches and corresponding reduced average voltage for the buck converter circuit of FIG. 1.
Figure 2B:
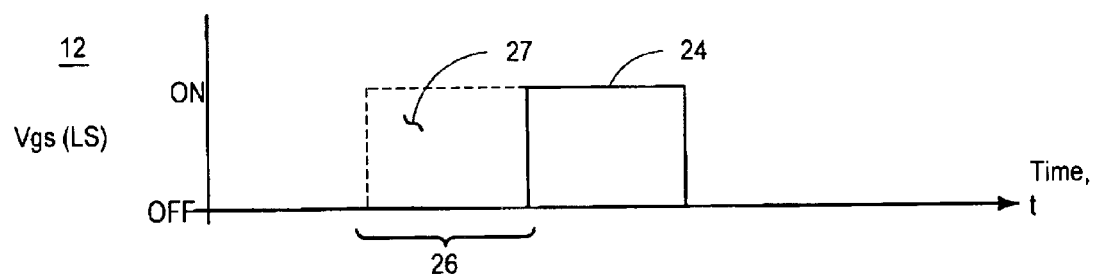
Figure 2C:
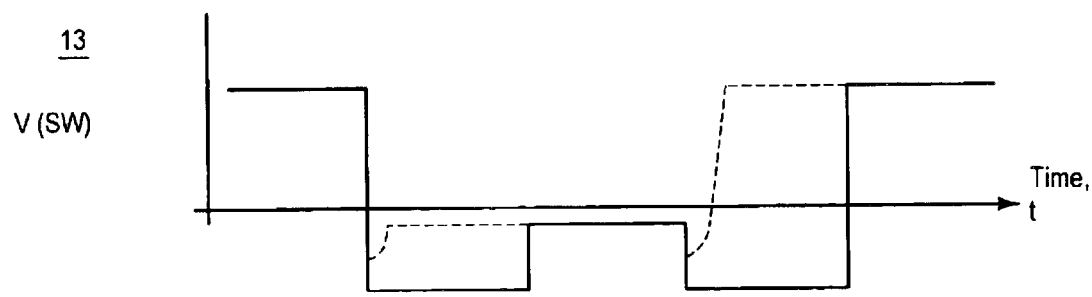

FIGS. 2a–c show timing diagrams for the synchronous buck converter if FIG. 1 to illustrate the effects of excessive or non-optimal delay time. An ideal voltage response case is shown as a rising dashed line in FIGS. 2a and 2b where high-side switch 11 and low-side switch 12 are turned off and on at exactly a same time 24. The rising solid lines in FIGS. 2a and 2b illustrate a response associated with an excessive delay 26 in switching between high-side switch 11 and low-side switch 12. FIG. 2c shows voltage at switch node 13 as a function of time where the dashed line represents a more desirable voltage ($V_{SW}$) response.

The present invention controls the rising edge or turn-on delay 27 for both $V_{gs}(HS)$ and $V_{gs}(LS)$ to provide the desired or more optimal voltage ($V_{sw}$) response shown in FIG. 2c. In particular, the present invention increases and decreases the turn-on delay time based on current conduction in the low-side switch. This provides a more efficient dc power converter. The present invention is better understood by referring to FIGS. 3–11 together with the following detailed description. For ease of understanding, like elements or regions are labeled the same throughout the detailed description and FIGURES where appropriate.

Figure 3:
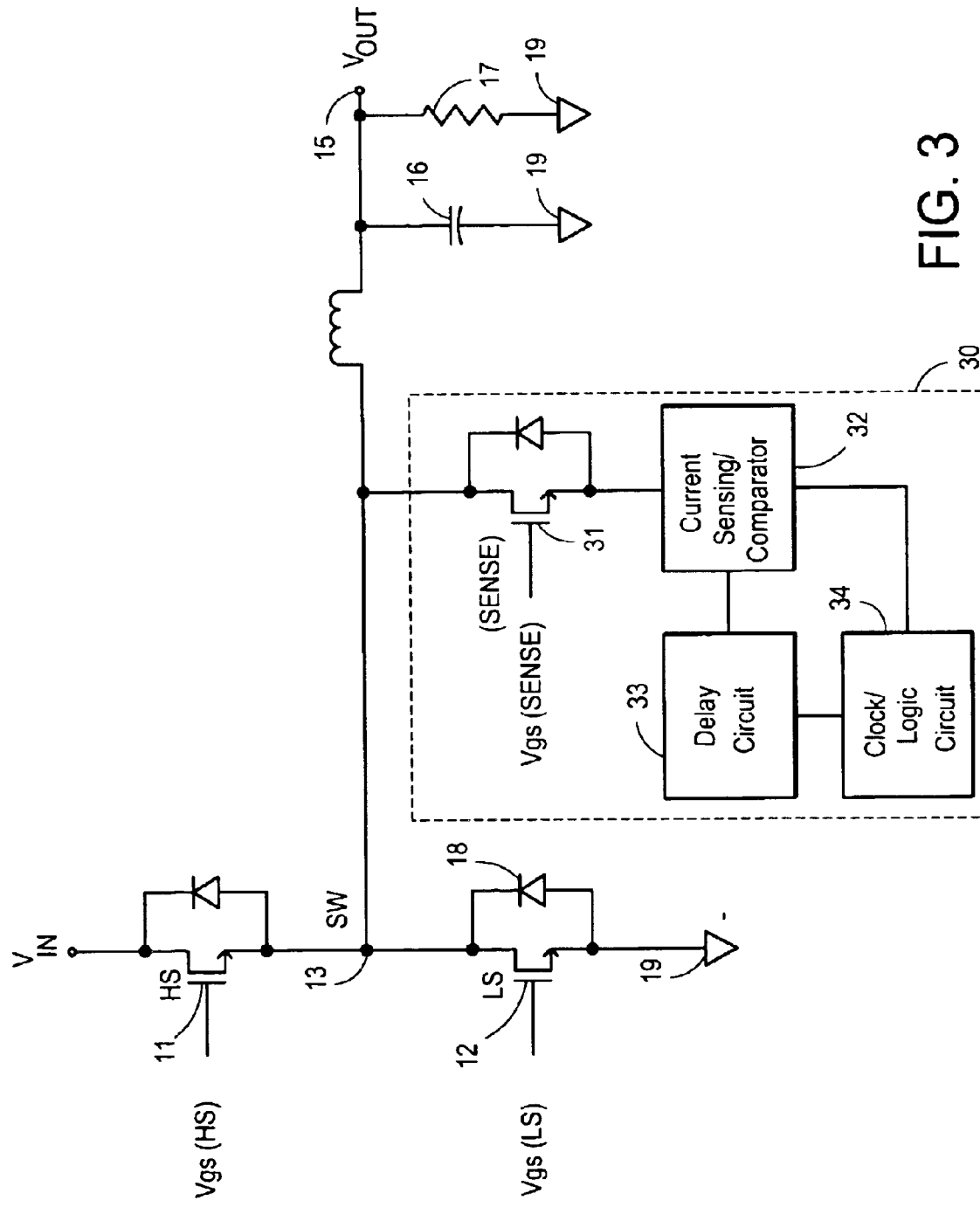
FIG. 3 illustrates a generalized block diagram of a turn-on delay control structure according to the present invention implemented with the DC-DC converter of FIG. 1.

FIG. 3 illustrates a generalized block diagram of a control circuit or system 30 according to the present invention as part of the synchronous buck DC-DC converter of FIG. 1. Control circuit 30 includes four functional blocks including a sensing device or sense FET 31, a current sensing and comparator circuit 32, a time delay circuit 33, and a clock/logic circuit 34. In a preferred embodiment, time delay circuit 33 comprises a digital controlled delay (DCD) circuit, which is described in more detail with reference to FIG. 7. In an alternative embodiment, time delay circuit 33 comprises a charge controlled delay (CCD) circuit, which is described in more detail with reference to FIG. 8. Preferably, time delay circuit 33 is capable of increasing and decreasing delay time.

Using, for example, buffered PWM signals, clock/logic circuit 34 predicts and adjusts the delay time in switching between the high-side 11 and low-side 12 power MOSFET switches. Sense FET 31 preferably comprises a MOSFET device. Alternatively, sense FET 31 comprises a JFET. The characteristics of sense FET 31 depends on the magnitude of the current (e.g., conduction or cross-conduction) to be sensed, the type of FET technology selected, and $Vgs_{(SENSE)}$. Preferably, the sense current limit is set to minimize power losses and to provide enough magnitude for a current comparator function. Preferably, the present invention includes control circuits 30 for high-side switch 11 and low-side switch 12, which are now described with reference to FIGS. 4 and 5.

Figure 4:
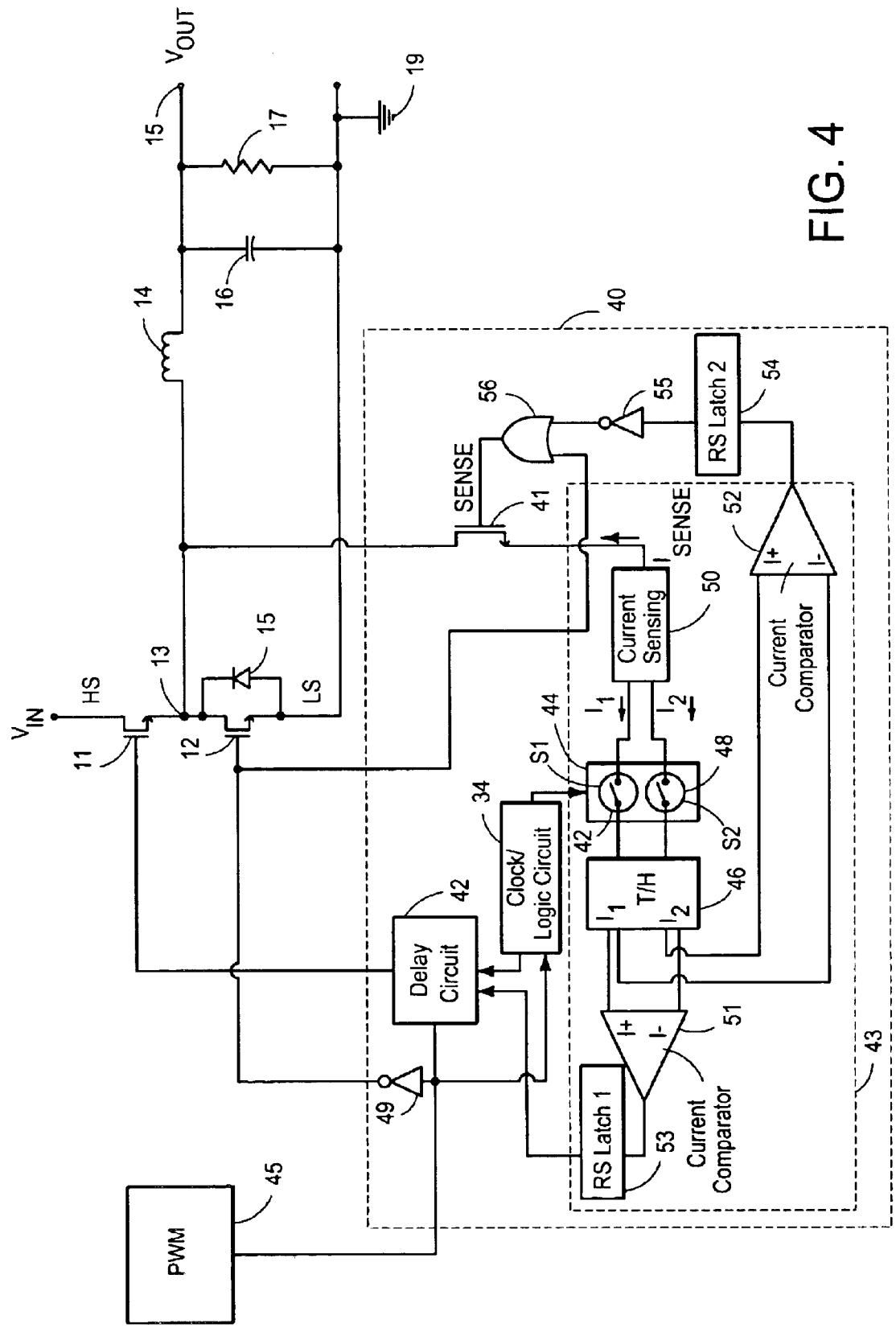
FIG. 4 illustrates a circuit diagram of a turn-on time delay control structure for controlling a high-side power MOSFET according to the present invention.

FIG. 4 illustrates a functional diagram of a high-side switch control structure, system, or circuit 40 according to the present invention for controlling turn-on time delay for high-side power MOSFET transistor 11. Control circuit 40 includes a sense FET 41 that senses current from low-side power MOSFET transistor 12. The drain of sense FET 41 is coupled to switch node 13, and the source of sense FET 41 is coupled to a high-side switch current sense and comparator circuit 43. Current sense and comparator circuit 43 includes a current sensing device 50 (e.g., a current mirror or the like), a switching functional module 44, a track and hold module 46, a first current comparator 51, and a second current comparator 52.

Based on feedback conditions from current sense and comparator circuit 43, the turn-on time delay for high-side switch 11 is adjusted by a delay circuit 42. The input signal to delay circuit 42 is a pulse width modulation (PWM) input from PWM circuit 45, which controls the width of a digital pulse to delay circuit 42. Additionally, output from PWM circuit 45 is input to an inverter 49, which inverts the signal from PWM circuit 45 and outputs the signal to the control electrode of low-side switch 12.

The high-side switch control method or operation begins with high-side switch 11 off, low-side switch 12 on and sense FET 41 on. Delay circuit 42 initially sets or resets the turn-on or rising edge delay for high-side switch 11 to a maximum level. Under these initial conditions, a small fraction of current from low-side switch 12 is conducted through sense FET 41, which is denoted $I_{SENSE}$. The initial condition $I_{SENSE}$ is registered into two current outputs denoted I1 and I2 using current sensing module 50. Current sensing module 50 outputs I1 and I2 to track and hold module 46 through switching function module 44. Under these initial conditions, switch (S1) 47 and switch (S2) 48 in switching function module 44 are both closed. This results in an initial current level condition in track and hold module 46 such that $I1=I2=I_{SENSE}$.

Outputs from track and hold module 46 are coupled to a first current comparator 51 and a second current comparator 52 such that I1 is coupled to the I+ input of current comparator 51 and conversely to the I− input of current comparator 52. Likewise, I2 is coupled to the I− input of current comparator 51 and conversely to the I+ input of current comparator 52. Current comparators 51 and 52 are designed such that when the two inputs to the comparators meet the condition I+=I− or I+<I−, the comparator output is a logic low. Thus, under the initial conditions previously set forth, current comparators 51 and 52 are at logic low. The output of current comparator 51 is coupled to a first RS latch 53. The output of current comparator 52 is coupled to a second RS latch 54. Likewise, the initial conditions of RS latch 53 and 54 are logic low.

Just prior to PWM module 45 switching $V_{gs}$(LS) low to turn off low-side switch 12, clock/logic circuit 34 switches switch 48 in switching function module 44 open. This stops I2 from tracking $I_{SENSE}$ and sets the stored level of I2 in track and hold module 46. After $V_{gs}$(LS) is switched low and before body diode 18 associated with low-side switch 12 starts conducting current, circuit 43 momentarily continues to register that $I1=I2=I_{SENSE}$ and current comparator 51 and 52 outputs remain at logic low.

After body diode 18 starts to conduct current, voltage V(sw) at switching node 13 changes to a more negative voltage due to current flowing from inductor 14 through body diode 18. The more negative V(sw) is, the larger $I_{SENSE}$ becomes because sense FET 41 is biased in the linear region and sense FET 41 current is proportional to $V_{DS}/R_{DS(ON)}$. When body diode 18 conducts current, $I_{SENSE}$ increases due to the larger $V_{DS}$ of sense FET 41. The increase in $I_{SENSE}$ is registered because current input I1 continues to track $I_{SENSE}$ with switch 47 still closed. When I1 becomes larger than I2, the output of current comparator 51 is switched to logic high, while the output of current comparator 52 remains logic low.

The logic high signal from current comparator 51 is an indication of body diode conduction in low-side switch 12. This also indicates that there is too much turn-on delay for high-side switch 11, and that a smaller or decreased delay is required for the next control loop clock cycle. This signal is latched into delay circuit 42 using RS latch 53. At this point in the control sequence, just prior to turning on high-side switch 11, sense FET 41 is still conducting current in parallel with body diode 18 such that I1 remains larger than I2.

After switching $V_{gs}$(HS) to high, which turns on high-side switch 11, V(sw) at switching node 13 starts charging to a positive voltage through high-side switch 11. $I_{SENSE}$ now flows in the opposite direction compared to when V(sw) is at a negative voltage. This results in a logic condition I1<I2 because I1 continues to track $I_{SENSE}$ through switch 47. This condition sets the output of current comparator 52 to logic high. The logic high signal from current comparator 52 is latched to sense FET 41 through RS latch 54, inverter 55, and logic gate 56 such that $V_{gs(SENSE)}$ is switched logic low and sense FET 41 is turned off.

There is a very short period of time where both high-side switch 11 and sense FET 41 are conducting current simultaneously. The amount of current flowing to sense FET 41 during this condition, however, can be limited to a few milli-amperes with the proper size and selection of sense FET 41. For example, sense FET 41 comprises a high voltage NMOS device (W=60 um/L=3 um) rated at greater than about 30 volts. Such a device senses about 1 mA of conduction current with $V_{gs(SENSE)}$=5V. This corresponds to about 0.65 mW of power loss from sense FET 41, which minimizes any power losses associated with sense FET 41 and control feedback circuit 43. After $V_{gs}$(HS) is switched low turning off high-side switch 11, and $V_{gs}$(LS) is switched high turning on low-side switch 12, clock/logic circuit 34 closes switch 48, and current comparator 51 and 52 as well as RS latch 53 and 54 are reset to logic low for the next clock cycle of the control sequence.

In the manner described above, the turn-on delay for high-side switch 11 will be reduced each switching cycle of PWM circuit 45 whenever body diode conduction associated with low-switch 12 is sensed. The turn-on delay for high-side switch 11 eventually is reduced small enough such that there is no significant body diode 18 conduction and current comparator 51 cannot detect a difference in $I_{SENSE}$ before and after low-side switch 12 is turned off. In this particular clock cycle, delay circuit 42 receives a logic low signal instead of a logic high signal from control feedback circuit 43. This is an indication that there is too little turn-on delay for high-side switch 11 and a longer or increased delay is required for the next clock cycle of the control loop. In this case, delay circuit 42 increases the turn-on delay.

Based on sensing the conduction of body diode 18, delay circuit 42 continually and adaptively adjusts the turn-on delay for high-side switch 11. When delay circuit 42 comprises a DCD circuit as described below, the turn-on delay eventually cycles between a slightly shorter than ideal delay and a slightly longer than ideal delay. Alternatively, when delay circuit 42 comprises a CCD circuit, the turn-on delay will eventually stabilize within a small range due to the linear nature of the circuit. In this manner body diode conduction and reverse recovery losses are minimized and controlled to an optimal level.

Figure 5:
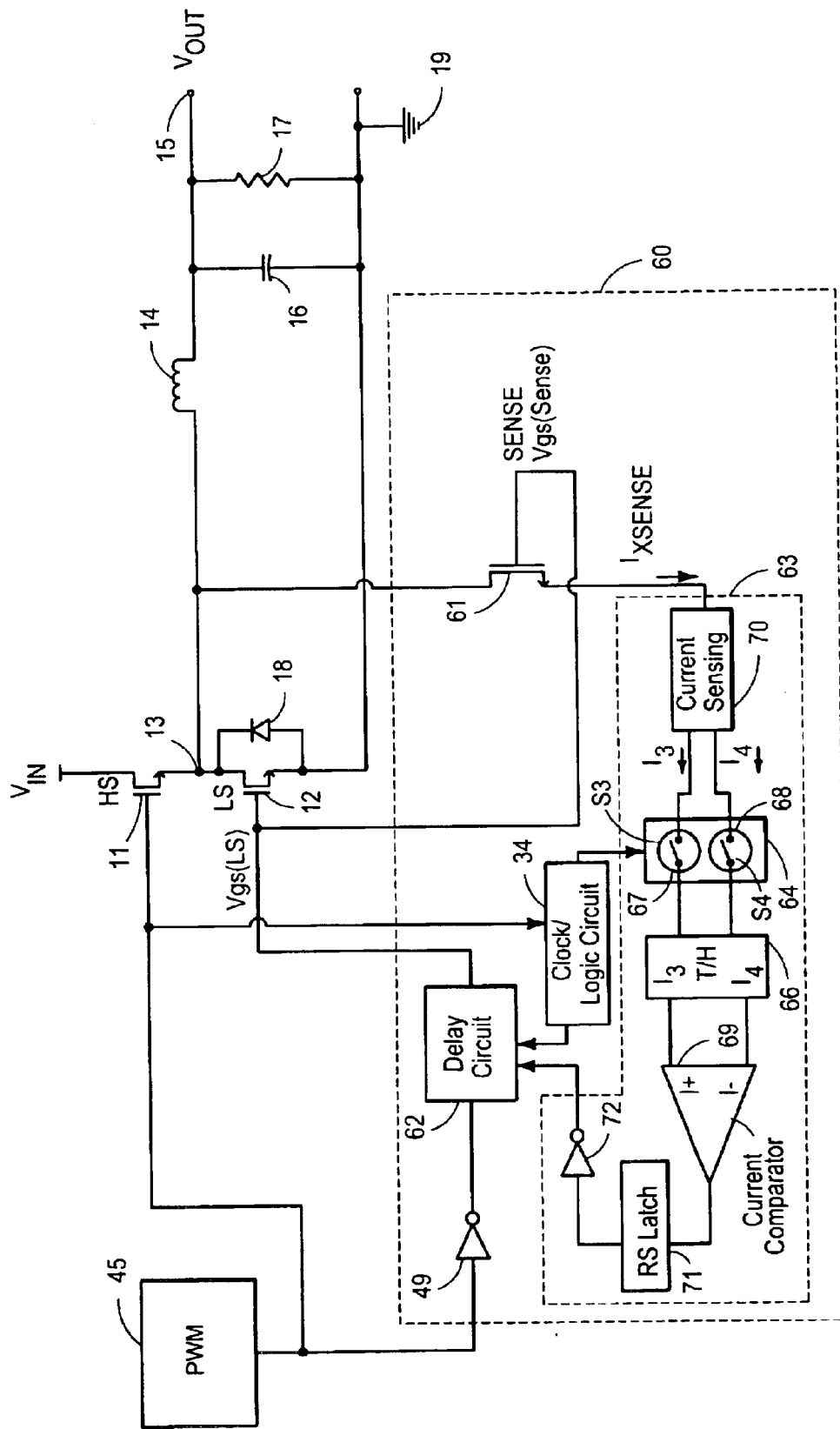
FIG. 5 illustrates a circuit diagram of a turn-on time delay control structure for controlling a low-side power MOSFET according to the present invention.

FIG. 5 illustrates a functional diagram of a low-side control structure, system, or circuit 60 according to the present invention for controlling turn-on time delay for low-side power MOSFET transistor 12. The principal of control feedback circuit 60 for low-side switch 12 is similar to the control principal of high-side switch 11 described in FIG. 4. Preferably, a sense FET 61 is used to sense the cross conduction current of low-side switch 12. Alternatively, sense FET 61 is used to sense body diode conduction current of low-side switch 12.

The drain of sense FET 61 is coupled to switch node 13 and the source of sense FET 61 is coupled to a current sense and comparator circuit 63. The $V_{gs}$(LS) node of low-side switch 12 is coupled to the $V_{gs}$(sense) node of sense FET 61 such that sense FET 61 is switched on and off with low-side switch 12. Based on feedback conditions, the turn-on delay for low-side switch 12 is adjusted by a second delay circuit 62. The input signal to second delay circuit 62 is an inverted PWM output from PWM circuit 45 and inverter 49.

The low-side switch control operation begins in a like manner as the high-side switch control operation previously described except that high-side switch 11 is on, low-side switch 12 is off, and sense FET 61 is off. Delay circuit 62 initially sets or resets the turn-on rising edge delay for low-side switch 12 to a maximum level. Additionally, switch (S3) 67 and switch (S4) 68 in switching function module 64 are both closed. Under these initial conditions, the cross conduction current of sense FET 61, denoted Ix(sense), is zero. Accordingly, current sensing or current mirror circuit 70 registers two current outputs denoted I3 and I4, with initial condition equal to zero.

Current outputs I3 and I4 are coupled to track and hold module 66 through switching function module 64. Track and hold module 66 outputs corresponding to I3 and I4 are coupled to the I+ input and I– input of current comparator 69 respectively. As with the previously described comparators, current comparator 69 is designed such that when the two inputs meet the condition I+=I– or I+<I–, the output comparator 69 is logic low. The output of current comparator 69 is coupled to RS latch 71. Under the initial conditions set forth (Ix(sense)=I3=I4=0), the output of current comparator 69 and RS latch 71 is a logic state low.

Just prior to switching $V_{gs}$(HS) low to turn off high-side switch 11, clock/logic circuit 34 switches switch 68 in switching function module 64 open. This stops I4 tracking Ix(sense), and sets the stored level of I4 in track and hold module 66 at zero. I3 continues to track Ix(sense) and the output of current comparator 69 momentarily remains at logic low.

After high-side switch 11 is switched off and before the maximum delay time elapses, body diode 18 conducts current. This results in Ix(sense) remaining zero or becoming negative (i.e. flowing source to drain). The output of current comparator 69 and RS latch 71 remains low under these conditions and no cross conduction current is sensed by sense FET 61. Once low-side switch 12 is switched on, Ix(sense) will remain negative after low side switch 12 is on if there no cross conduction current detected, which corresponds to high side switch 11 being off for a period time before low side switch 12 is on. Ix(sense) becomes positive (i.e. flowing drain to source) after low side switch 12 is on and cross-conduction is detected. This results in I3>I4 and current comparator 69 and RS latch 71 output is switched to logic high.

The output of RS latch 71 is coupled to inverter 72, which in turn is coupled to delay circuit 62. When no cross conduction current is detected, the logic low signal at current comparator 69 is latched and inverted to a logic high input to delay circuit 62. The logic high signal is an indication of too much turn-on delay for low-side switch 12 and a shorter delay is required for the next clock cycle. The turn-on delay for low-side switch 12 is thus reduced each switching cycle of PWM circuit 45 whenever cross current conduction associated with low-switch 12 is not sensed. When cross conduction current is sensed by sense FET 61, delay circuit 62 receives a logic low signal. This is an indication to increase the turn-on delay for the next clock cycle. In this manner the turn-on delay for low-side switch 12 is adaptively adjusted to an optimum level.

Figure 6:
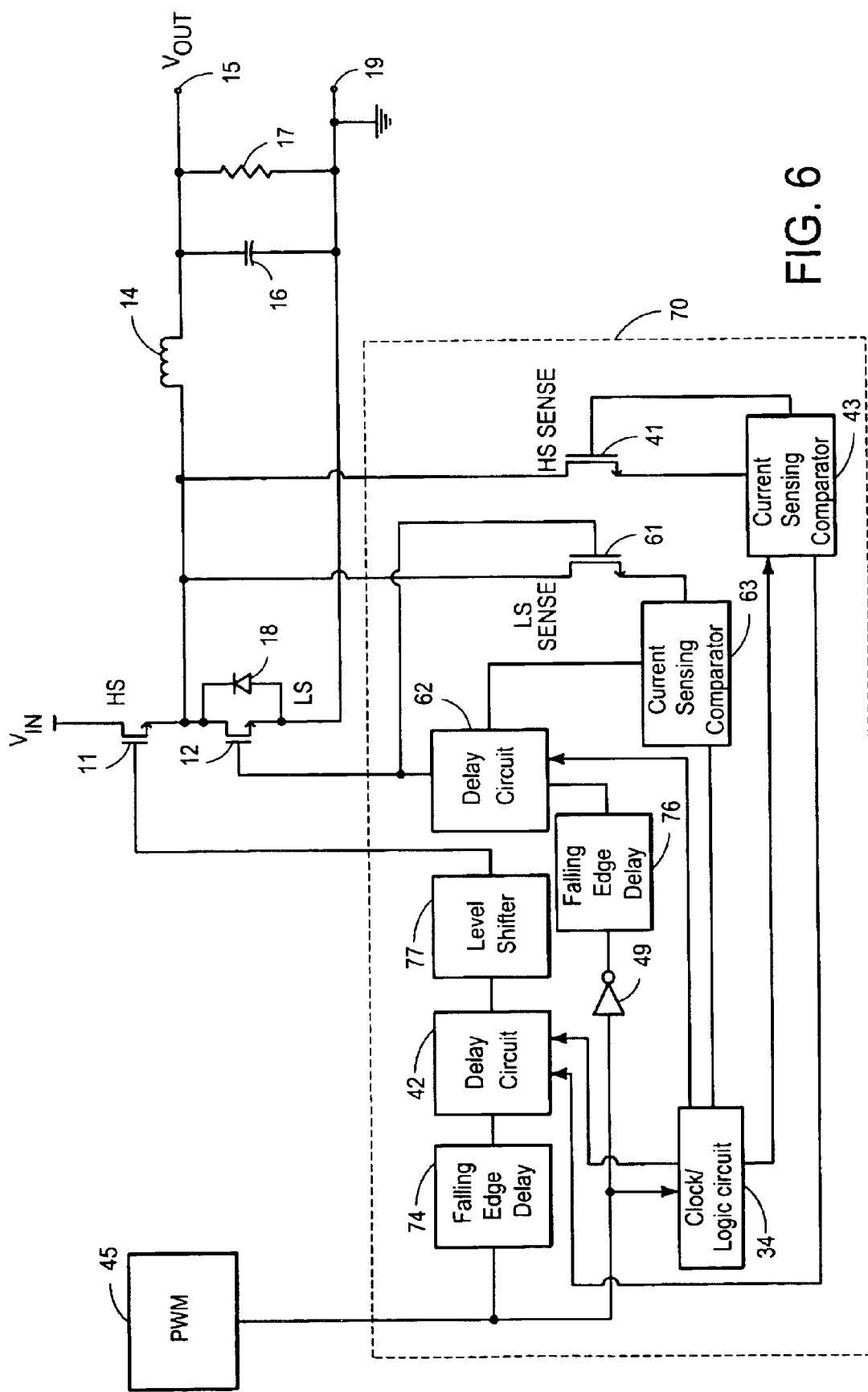
FIG. 6 illustrates a functional diagram implementation of a turn-on delay control circuit for both a high-side power MOSFET and a low-side power MOSFET according to the present invention.

FIG. 6 illustrates a functional diagram implementation of a turn-on delay control circuit 70 according to the present invention for both high-side power MOSFET 11 and low-side power MOSFET 12. Control circuit 70 is a superposition of control circuits 40 and 60 described in conjunction with FIGS. 4 and 5. Additionally, falling-edge delay circuits 74, 76 are added to high-side switch 11 and low-side switch 12 gate drive signal paths respectively. Falling-edge delay circuits 74 and 76 provide a fixed delay to each circuit to compensate for the intrinsic delay present when delay circuits 42 and 62 are set at the minimum rising edge or turn-on delay. This implementation provides for a greater range of turn-on delay control for high-side switch 11 and low-side switch 12. Falling-edge circuits 74 and 76 comprise, for example DCD circuits similar to the DCD circuit shown in FIG. 7 with the AND gate replaced with an OR gate. A level shifter 77 is further included between delay circuit 42 and the control electrode of high side power MOSFET 11 to provide a floating bootstrap supply.

Figure 7:
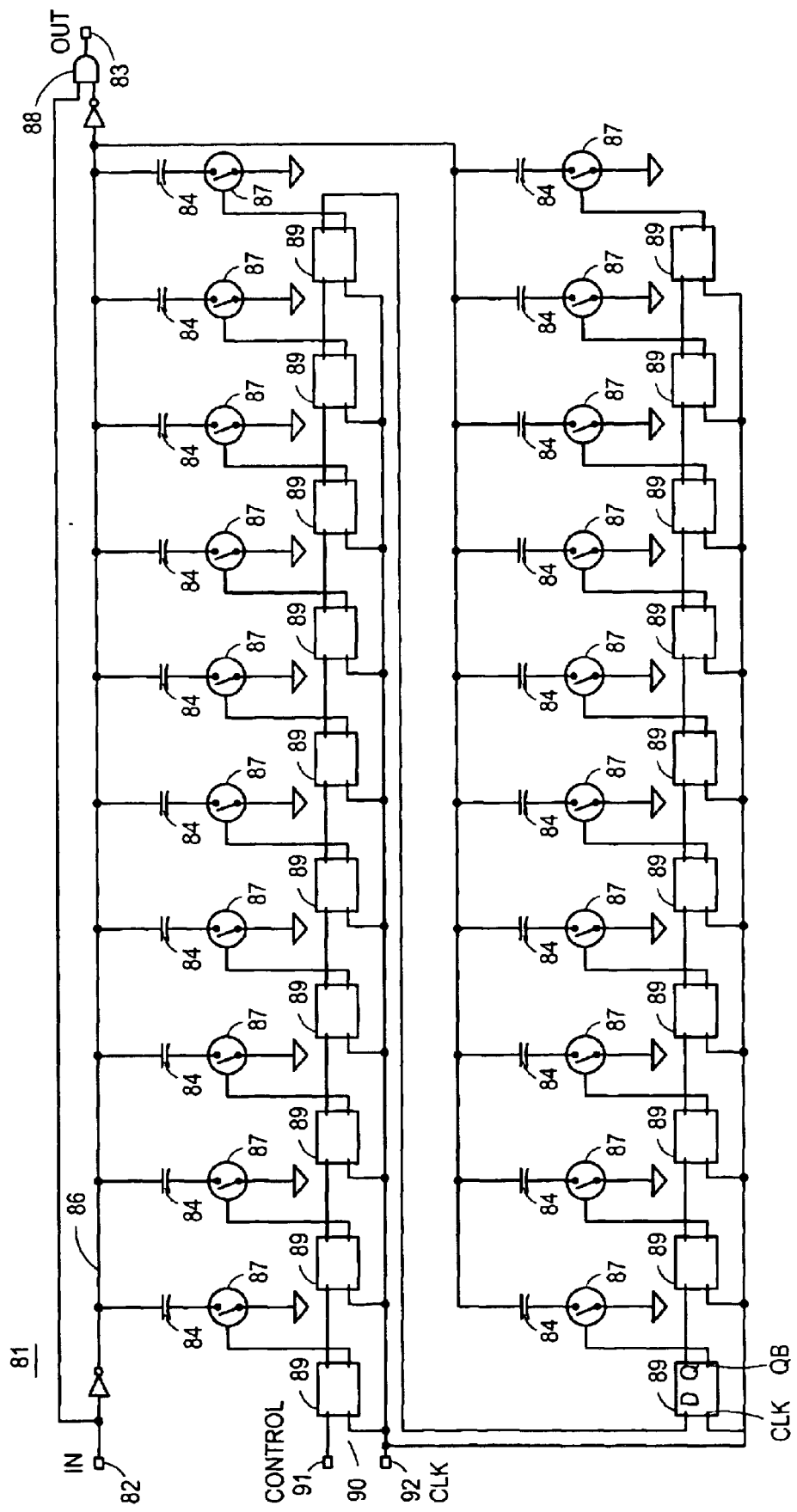
FIG. 7 illustrates a circuit diagram of a digital controlled delay (DCD) circuit according to the present invention.

Delay circuits 42 and 62 preferably comprise a digital controlled delay (DCD) or a charged control delay circuit (CCD). FIG. 7 shows a circuit diagram of a preferred digital controlled delay (DCD) circuit 81 according to the present invention. The amount of rising edge or turn-on propagation delay from DCD circuit 81 input 82 to DCD circuit 81 output 83 is determined by the number and capacitance of a multiplicity of load capacitors 84 connected to a delay line 86. Only the rising edge or turn-on delay is varied. Logic AND gate 88 is coupled to input 82, output 83, and delay line 86 to minimize the falling edge or turn-off delay.

In a preferred embodiment, DCD circuit 81 comprises about 20 load capacitors 84. Each load capacitor 84 constitutes a step increment in propagation delay. The delay increment contributed by each load capacitor 84 may be adjusted by changing the capacitor value. The delay increment of each load capacitor 84 is activated when its associated switch 87 is closed. In a preferred embodiment, the delay increment of each load capacitor 84 is approximately 2 nanoseconds of propagation delay. This represents a maximum propagation delay of 40 nanoseconds when all switches 87 are closed. A high signal voltage for each switch 87 closes the switch, while a low signal voltage for each switch 87 opens it.

Each switch 87 signal voltage is controlled by an associated D-type flip-flop (DFF) 89 in a shift register 90. Each DFF 89 is coupled in series, and a control signal 91 for DCD circuit 81 is coupled to the first DFF 89 in the shift register. Control signal 91 is input from RS latches (e.g., RS latches 53 and 71) previously described and is either high or low. Clock signal 92 serves to shift the input control signal 91 to the output of the first DFF 89. All switches 87 are initially reset to closed producing the maximum propagation delay.

In the case of high-side power MOSFET 11 control, when body diode 18 conduction is detected, control signal 91 is latched to logic high. This logic high state is sent to the shift register after each clock cycle to open an individual switch 87, which descreases the turn-on delay. When no body diode 18 conduction is detected, control signal 91 is latched to logic low. In a like manner, this state is sent to the shift register to close individual switches 87 and increase the turn-on delay.

Figure 8:
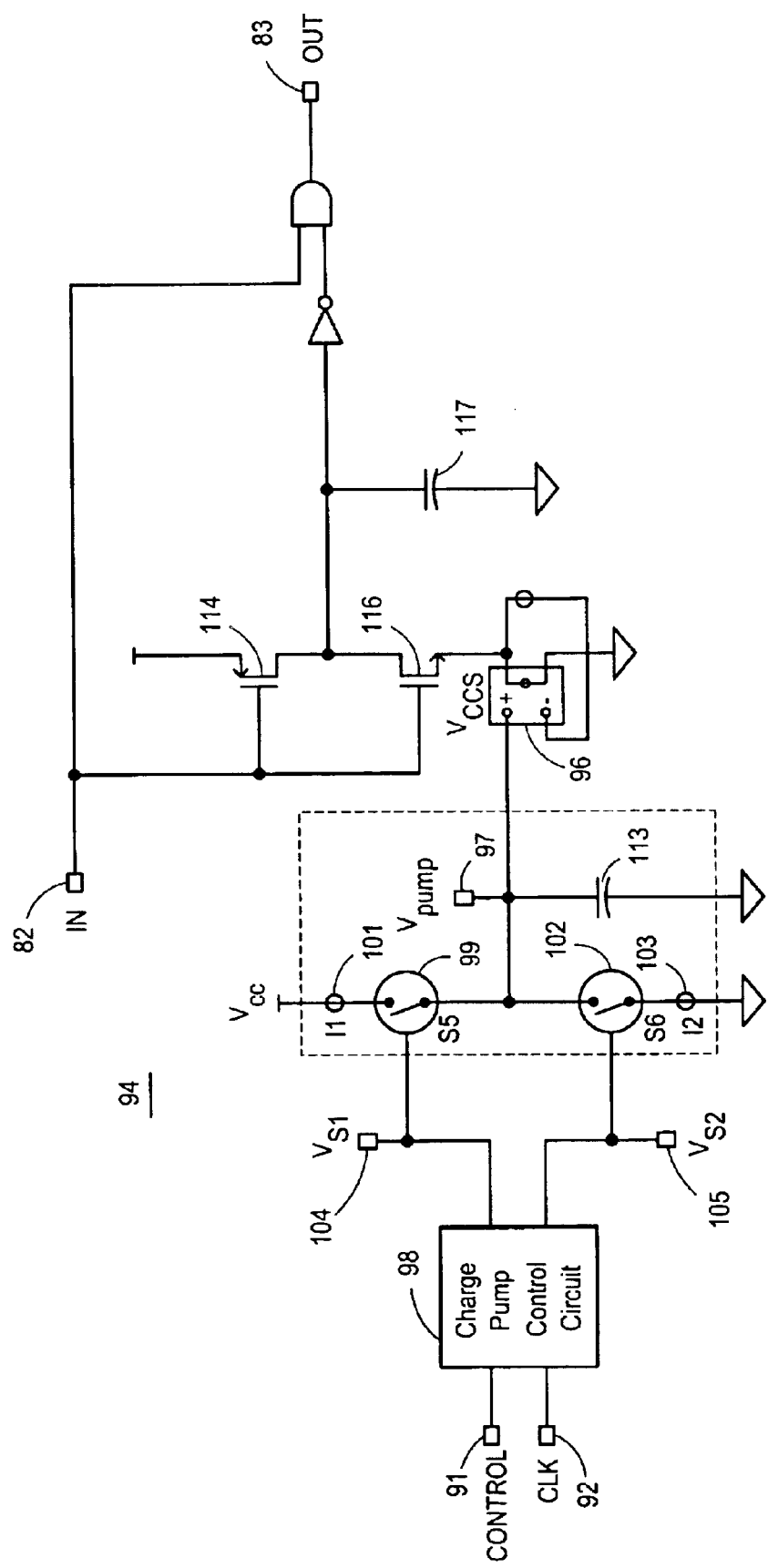
FIG. 8 illustrates a circuit diagram of an alternative charge controlled delay (CCD) circuit according to the present invention.

FIG. 8 illustrates the implementation of an alternative charge controlled delay (CCD) circuit 94 according to the present invention. The amount of rising edge or turn-on propagation delay from CCD circuit 94 input 82 to CCD circuit 94 output 83 is determined by voltage controlled current source (VCCS) 96. VCCS 96 input current is controlled by charge pump output voltage V(pump) 97. Voltage inputs (VS1) 104 and (VS2) 105 are used to close/open switches (S5) 99 and (S6) 102 respectively. Capacitor ($C_{pump}$) 113 stores charge for output voltage 97, which allows output voltage 97 to stay more constant when both switches 99 and 102 are open. Switches 114 (MP1) and (MN1) 116 function as a signal inverter. Capacitance ($C_{load}$) 117 is a fixed capacitance load similar to load capacitors 84 of FIG. 7.

Increasing the amount of input current to VCCS 96 decreases the rising edge of turn-on propagation delay between input 82 and output 83. Charge pump control circuit 98 controls charge pump output voltage V(pump) 97. Control signal 91 and clock signal 92 are input to charge pump control circuit 98 to indicate body diode conduction and to adjust the turn-on delay respectively for each particular clock cycle. When body diode 18 conduction is sensed, control signal 91 is latched logic high and switch (S5) 99 is closed for a certain time to allow V(pump) 97 to charge to a higher voltage by current source 101. This reduces the turn-on delay between input 82 and output 83. When no body diode conduction is detected, switch (S6) 102 is closed for a short period of time and V(pump) 97 is discharged to a lower voltage by current source 103. This increases the turn-on delay between input 82 and output 83.

Figure 9:
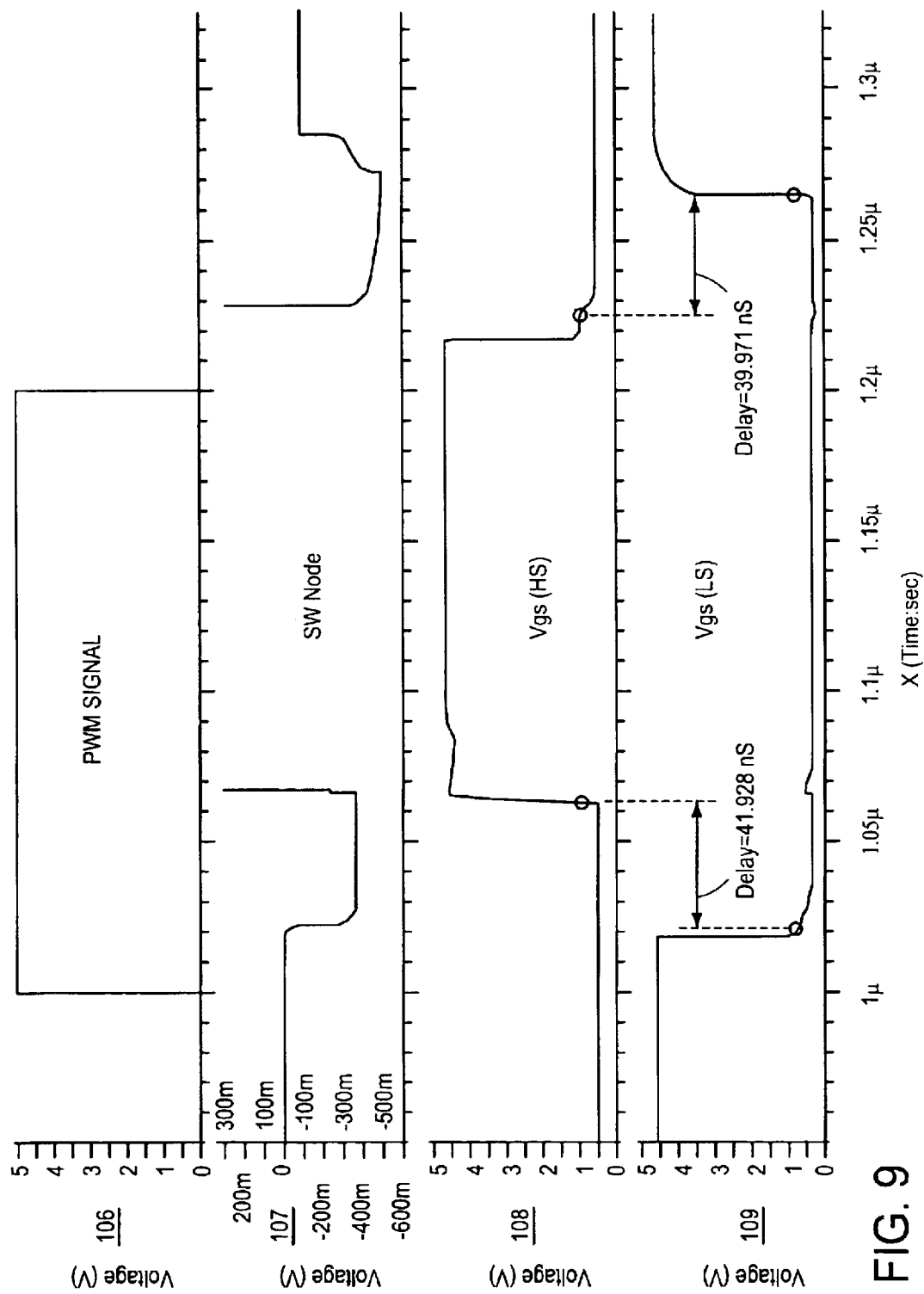
FIG. 9 illustrates timing diagrams showing voltage responses of the DC-DC converter of FIG. 1.

FIG. 9 illustrates timing diagrams simulating voltage responses of a DC-DC converter circuit without the present invention. PWM voltage signal 106, V(sw) voltage 107, high-side switch signal voltage Vgs(HS) 108, and low-side switch signal voltage Vgs(LS)109 response variation with time are shown simulating a large turn-on delay that is representative of a DC-DC converter without the present invention, or with the turn-on time delay set to maximum.

Figure 10:
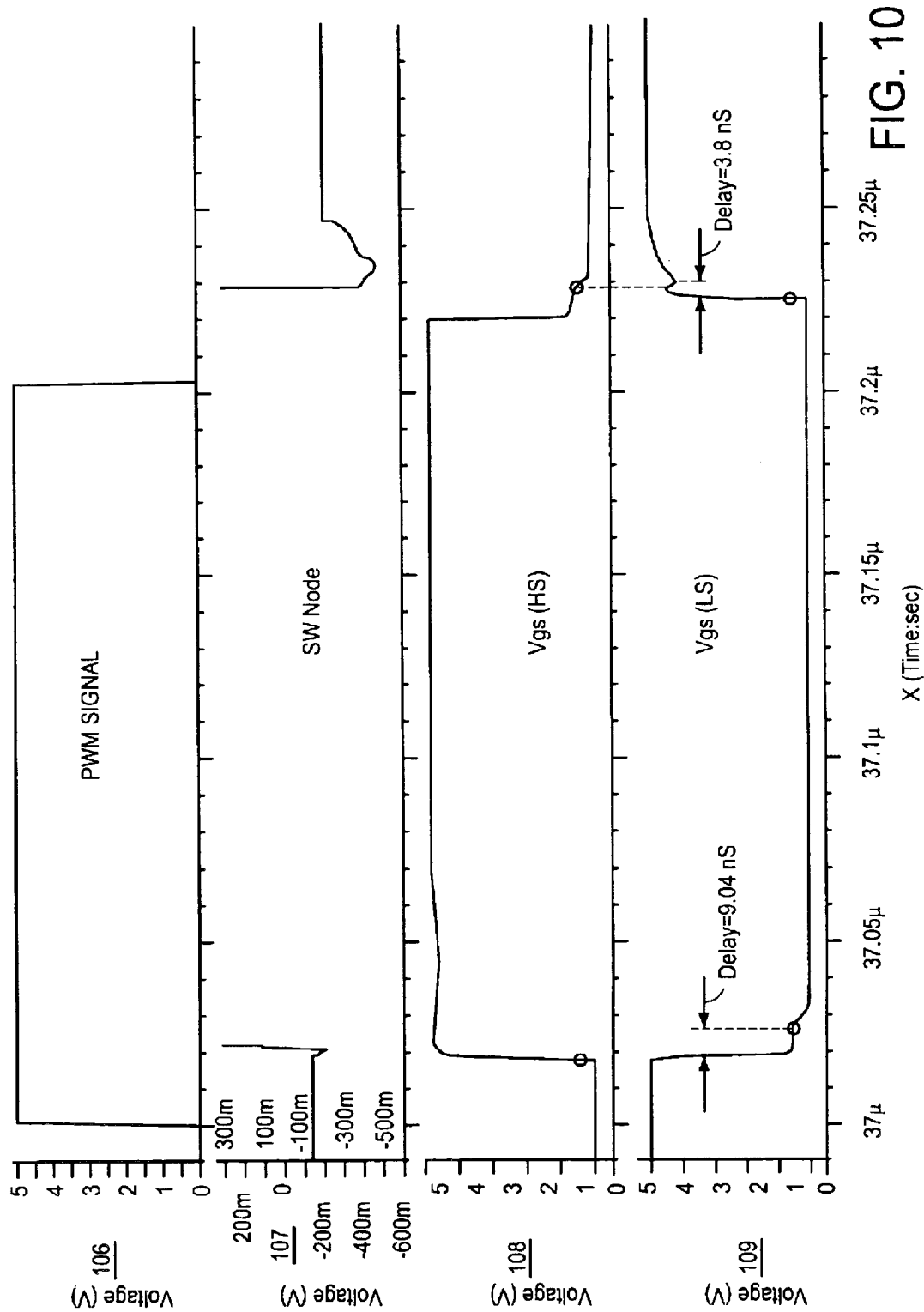
FIG. 10 illustrates timing diagrams showing voltage responses a DC-DC converter with a DCD delay circuit embodiment according to the present invention.

FIG. 10 illustrates timing diagrams simulating voltage responses of a DC-DC converter with a DCD circuit embodiment 81 according to the present invention. PWM voltage signal 106, V(sw) voltage 107, high-side switch signal voltage Vgs(HS) 108, and low-side switch signal voltage Vgs(LS) 109 response variation with time are shown simulating an optimally small turn-on delay that is representative of a DC-DC converter with the DCD embodiment 81 of the present invention. This simulation demonstrates that after a few PWM signal cycles (i.e. clock cycles), the present invention adaptively adjusts the turn-on delay to an optimal level and effectively minimizes body diode conduction and reverse recovery losses.

Figure 11:
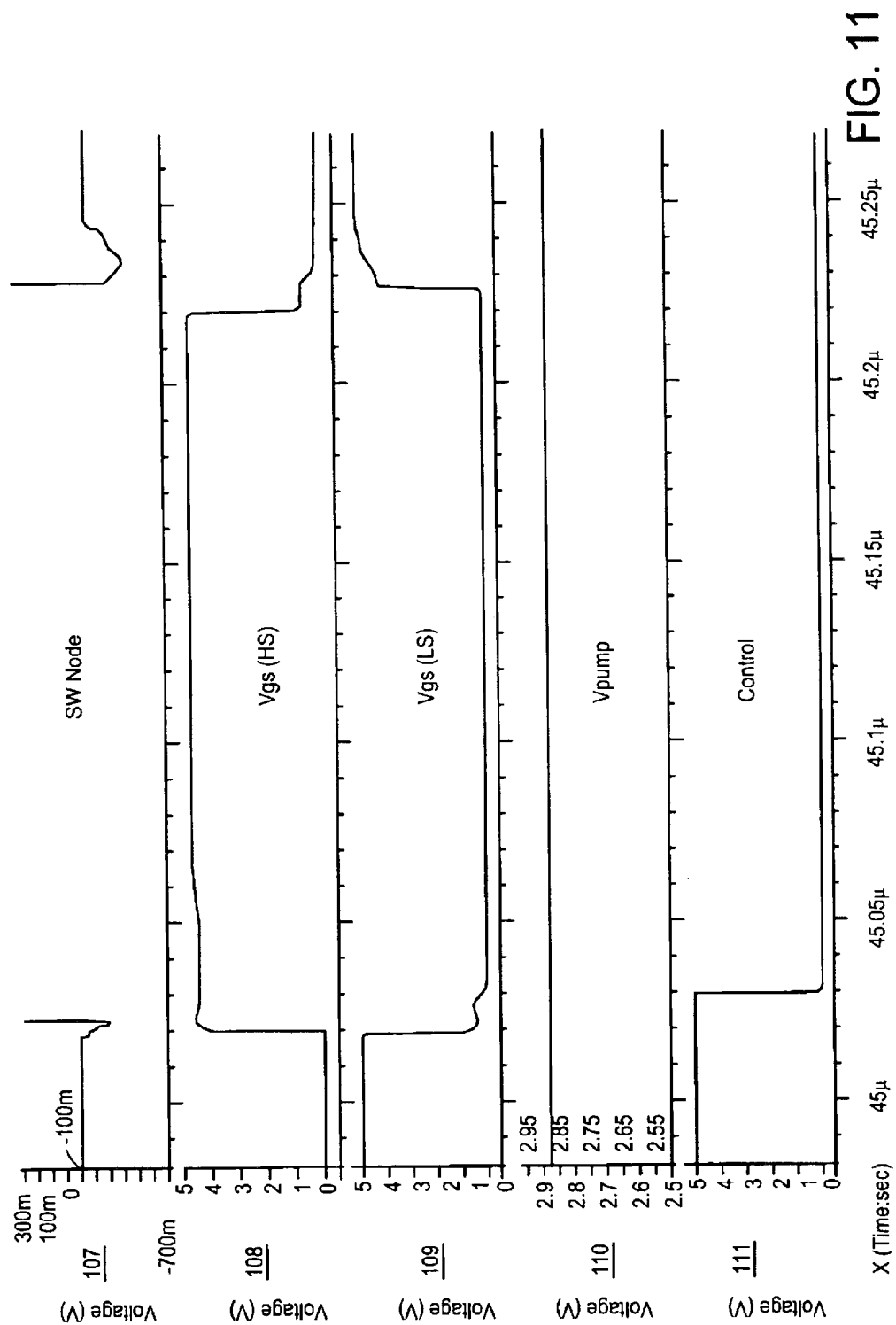
FIG. 11 illustrates timing diagrams showing voltage responses of a DC-DC converter with a CCD delay circuit embodiment according to the present invention.

FIG. 11 illustrates timing diagrams simulating voltage responses of a DC-DC converter with an alternative CCD circuit embodiment 94 according to the present invention. V(sw) voltage 107, high-side switch signal voltage Vgs(HS) 108, and low-side switch signal voltage Vgs(LS) 109, charge pump output voltage V(pump) 110, and control signal voltage 111 response variation with time are illustrated showing an optimally small turn-on delay that is representative of a DC-DC converter with CCD embodiment 94 according to the present invention. This simulation demonstrates the use of V(pump) 110 and control 111 signals to adjust and achieve a minimized turn-on delay for high-side MOSFET 12.

Thus it is apparent that there has been provided, in accordance with the present invention, a novel current-mode control method to maximize power efficiency of a DC-DC buck or boost converter by optimally minimizing the switching delay time between the high-side and low-side switches while minimizing simultaneous cross-conduction.

Although the invention has been described and illustrated with reference to specific embodiments thereof, it is not intended that the invention be limited to these illustrative embodiments. Those skilled in the art will recognize that modifications and variations can be made without departing from the spirit of the invention. For example, alternative time delay circuits may be incorporated in place of the DCD and CCD embodiments shown. Therefore, it is intended that this invention encompass all such variations and modifications as fall within the scope of the appended claims.

I claim:

1. A DC-DC converter that converts a first DC voltage to a second DC voltage comprising:
   a first output configured to control a first switch coupled to an input of the first DC voltage;
   a second output configured to control a second switch, wherein the first and second switches are controlled by respective first and second input signals to generate the second DC voltage;
   a sensing device configured to receive a sense current representative of a current through the second switch and responsively form a first current and a second current that are representative of the current through the second switch; and
   a control circuit configured to receive the first current and the second current and selectively control a first delay time between disabling the second switch and enabling the first switch, the control circuit also configured to use the first current to selectively decouple the sense current from the control circuit.

2. The DC-DC converter of claim 1, wherein the control circuit includes a delay circuit and wherein the control circuit is configured to receive a PWM input and delay the first delay time before forming an active state of the first input signal and wherein the control circuit is configured to receive the PWM input and delay a second delay time before forming an active state of the second input signal.

3. The DC-DC converter of claim 2, wherein the delay circuit comprises a charge controlled delay circuit.

4. The DC-DC converter of claim 2, wherein the delay circuit comprises a digital controlled delay circuit.

5. The DC-DC converter of claim 1, wherein the sensing device is configured to receive the sense current and responsively form the first current that is representative of a conduction current through the second switch and form the second current that is representative of a current through a body diode of the second switch, the sensing device configured to store a value of the first current as a first stored value and store both a value of the second current as a second stored value during at least a portion of an active time of the second input signal, and to compare the first stored value to a value of the second current to determine the first delay time.

6. The DC-DC converter of claim 1, wherein the second switch comprises a power MOSFET device.

7. The DC-DC converter of claim 6, wherein the sensing device senses current conduction of a body diode of the second switch.

8. A synchronous DC-DC converter structure comprising:
   a high-side MOSFET switch having a drain coupled to an input DC voltage and a source coupled to a switch node;
   a low-side MOSFET switch having a drain coupled to the switch node and a drain coupled to a ground node;
   a sensing transistor having a drain coupled to the switch node for selectively forming a sense current that is representative of current in the low side MOSFET switch; and
   a control structure configured to receive the sense current and responsively form a first current that is representative of the current in the low side MOSFET switch and a second current that is representative of the current in the low side MOSFET switch, the control structure configured to store the first current as a first value and store the second current as a second value during a portion of an active time of the low side MOSFET switch and to disable storing the first value prior to disabling the low side MOSFET switch, the control structure configured to selectively adjust a delay time between turning off the low-side MOSFET switch and turning on the high-side MOSFET switch and configured to use the first current and the second current to selectively form the sense current.

9. The structure of claim 8, wherein the control structure is coupled to an adjustable delay circuit.

10. The structure of claim 9 wherein the adjustable delay circuit comprises a digital controlled delay circuit.

11. The structure of claim 9 wherein the delay circuit comprises a charge controlled delay circuit.

12. The structure of claim 8, wherein the sensing transistor comprises a MOSFET transistor.

13. The structure of claim 8, wherein the sensing transistor senses body diode current conduction in the low-side MOSFET switch.

14. The structure of claim 8, wherein the sensing transistor senses cross conduction current in the low-side MOSFET switch.

15. A method for controlling delay time in a synchronous DC-DC converter having a high-side switch coupled to a low-side switch comprising the steps of:
   selectively forming a current sense signal representative of a current in the low-side switch;
   using the current sense signal to form a first current and a second current that are representative of the current sense signal;
   storing a value of the first current as a first stored value and storing a value of the second current as a second stored value during at least a portion of an active time of the low-side switch;
   disabling storing of the first current while holding the first stored value and maintaining storing the second current as the second stored value prior to disabling the low-side switch;
   selectively controlling a delay time between turning off the low-side switch and turning on the high-side switch responsively to the first stored value and the second stored value; and
   using the first stored value and the second stored value for selectively forming the current sense signal.

16. The method of claim 15 wherein the step of selectively controlling the delay time includes increasing the delay time.

17. The method of claim 15 wherein the step of selectively controlling the delay time includes decreasing the delay time.

18. The method of claim 15 wherein the step of selectively forming the current sense signal includes sensing current in the low-side switch with a MOSFET and wherein the step of using the first stored value and the second stored value for selectively forming the current sense signal includes using the first stored value and the second stored value for disabling the MOSFET.

19. The method of claim 15, wherein the step of selectively controlling the delay time includes controlling the delay time with a digital controlled delay circuit.

20. The method of claim 15, wherein the step of selectively controlling the delay time includes controlling the delay time with a charge controlled delay circuit.

* * * * *